July 21, 1959
J. C. BRIGGS
2,896,135
INSULATING MATERIAL
Filed July 16, 1957
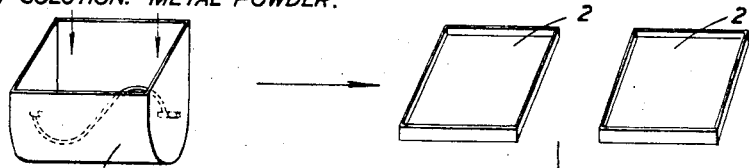
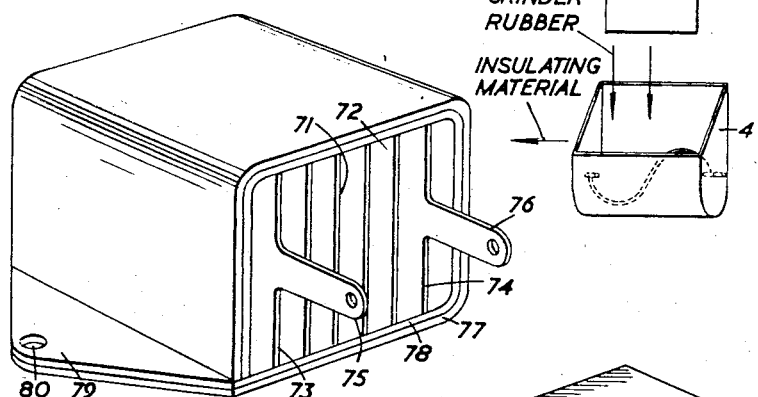
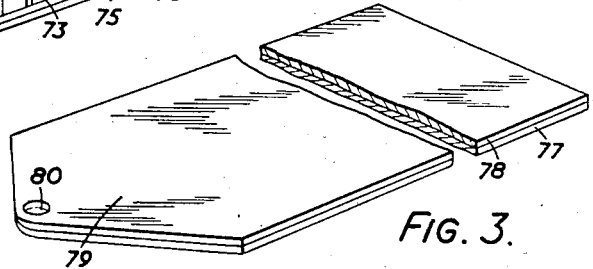
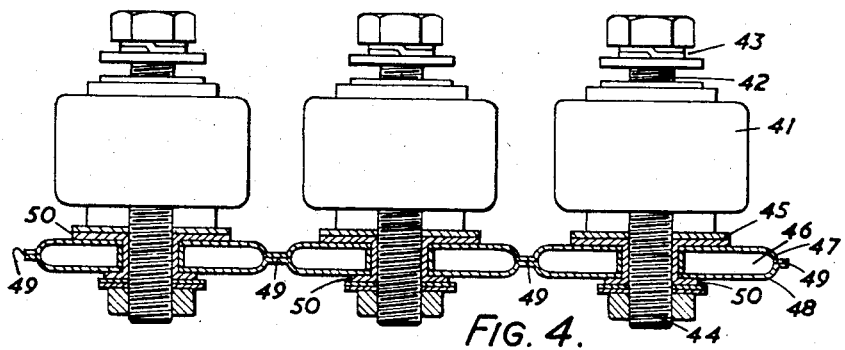
INVENTORS
JOHN COCKHAIN BRIGGS
BY Watson, Cole, Grindle & Watson   ATTORNEYS

United States Patent Office 2,896,135
Patented July 21, 1959

2,896,135

INSULATING MATERIAL

John Cockbain Briggs, Harrogate, England, assignor of one-half to Sydney Hirst, East Grinstead, Sussex, England Application July 16, 1957, Serial No. 672,307

Claims priority, application Great Britain July 16, 1956

21 Claims. (Cl. 317—234)

This invention relates to electrical insulating materials.

One of the primary difficulties of electrical insulation is the dissipation of heat from the insulated parts since electrical insulators are generally also bad thermal conductors. The loading of electrical apparatus is often limited by the thermal insulating properties of the electrical insulators used. It is an object of the present invention to reduce these difficulties by providing an electrical insulating material which does not have a low thermal conductivity.

Thus an electrical insulating material according to one aspect of the present invention comprises metal powder embedded in a matrix of rubber, the particles of the metal powder each being coated with an electrically insulating resin.

The term "rubber" is to include natural and synthetic rubbers but the rubber will preferably be a silicone rubber, and preferably the resin will be a silicone resin.

Silicone resins and silicone rubbers are well known and are based on the siloxane structure of alternate silicon and oxygen atoms, the rubber being formed by cross-linking very long chain molecules and the resins comprising complex three-dimensional networks.

Silicone rubber possesses the property of being a good electrical insulator and is resistant to extremes of temperature and will consequently operate at higher temperature than would natural rubber.

The powder is preferably of a metal with a high thermal conductivity such as copper or aluminum or may be a mixture of powders of two or more different metals. The metal powder has the advantage that, in addition to being a good thermal conductor, it may also be considerably cheaper than the silicone rubber in which it is embedded.

The silicone resins are good electrical insulators, are chemically and physically stable and are resistant to extremes of temperature and have the distinctive property of adhering strongly to the particles of the metal powder and forming a strong bond with silicone rubber. It is difficult to bond silicone rubber directly to the particles of the metal powder satisfactorily. The coating of resin round each particle of the metal powder provides an electrical insulation between the particles and also enables the particles to be bonded to the matrix material of silicone rubber to form a composite material.

Silicone rubbers may be cold-vulcanizing and thus have advantages over insulating materials which require heat for curing. However, even in applications where cold-vulcanizing silicone rubbers are preferred the resin coating on the metal powder particles may be heat cured since they are coated before the powder is added to the silicone rubber. The present material when incorporating a cold-vulcanizing silicone rubber is therefore suitable for applications where high temperatures for curing would be undesirable, as for example for insulating rectifiers of the selenium or germanium p–n junction types whose rectification properties are destroyed by high temperatures.

For certain applications it is advantageous for the resin coating to incorporate a ceramic material such as silica, calcium carbonate, alumina, china clay or mica or a mixture of any of these. Such an insulating material is suitable for applications in which it is liable to be subjected to considerable mechanical pressure.

In a method of making an electrical insulating material according to a further aspect of the present invention the metal powder is mixed with a solution of the electrically insulating resin containing sufficient solvent to give a fluid consistency after addition of the metallic powder, the mixing being continued until the majority of the solvent is evaporated; the mixing is then stopped and the remainder of the solvent evaporated and the resulting coated powder particles are incorporated into the rubber material.

Preferably after the mixing of the powder and the solution is stopped the mixture is spread out into a thin layer and the remainder of the solvent allowed to evaporate. Generally evaporation takes place satisfactorily at atmospheric temperature but artificial means such as heating could be used to speed up evaporation. After evaporation the mixture may be lightly ground to break down any aggregates of the insulating powder which may have formed.

In order to produce a material suitable for use in conditions where it is likely to be subjected to considerable mechanical pressure a finely divided ceramic material such as silica, calcium carbonate, alumina, china clay or mica or a mixture of any of these may be incorporated into the resin solution.

For applications in which heat would be detrimental to the parts to be insulated a cold vulcanizing silicone rubber may be used in which case the vulcanizing catalyst may be mixed with the rubber after incorporation of the resin coated metal powder particles.

One specific example of an electrical insulating material according to the invention will now be described by way of example together with a method of manufacture and several modifications thereof and two rectifiers embodying material according to the invention, with reference to the accompanying drawings in which:

Figure 1 is a flow diagram for a method of manufacture of an insulating material according to the invention, Figure 2 is a perspective view of a further silicone rectifier, Figure 3 is a perspective view of a metal sheet coated with insulating material according to the invention used in the manufacture of the rectifier shown in Figure 2 and Figure 4 shows partly in cross section, a group of three water-cooled germanium rectifiers.

Firstly an electrical insulating material according to the invention will be described. The material comprises copper powder of 100 mesh (British Standard) coated with silicone resin and embedded in a matrix of silicone rubber, the proportions of the constituents being 75% powder, 20% rubber (which figure includes the vulcanizing catalyst used) and resin 5%, all quantities by weight. The silicone resin used is Wacker silicone resin solution K* marketed in Great Britain by Midland Silicones Ltd., under the designation MS 840. The silicone rubber is that marketed by Midland Silicones Limited under the name Wacker K.V. Medium grade and is used without filler.

A method of manufacture of the insulating material just described will now be given with reference to Figure 1. A sufficient quantity of silicone resin MS 840 referred to above is dissolved in acetone and is placed in a paddle mixer 1 which is of the well-known type used in the baking industry for mixing dough and operates on the Werner-Pfleiderer principle. The copper powder is added to the resin solution and mixing is continued until the majority of the solvent has been evaporated.

Initially there should be sufficient solvent present to give a fluid consistency to the mixture immediately after the addition of the metal powder.

The coated metal powder is then spread on shallow trays 2 to a depth of about 1 inch and left until the remainder of the solvent has evaporated. This process can take place in the atmosphere when it may take several hours but artificial means such as heat could be used to increase the speed of evaporation.

The metal powder is removed from the trays and is lightly ground 3 to break down any aggregates of particles that may have formed. The metal powder, each particle of which is now covered with an adhesive unbroken film of resin, is now put into a second paddle mixer 4 of the type already described in which there is already an amount of Wacker K.V. Medium grade silicone rubber which will, with the vulcanizing catalyst produce the properties given for the finished material described above. Mixing is continued until the metal powder particles are dispersed evenly through the rubber. The vulcanizing catalyst, which is in the form of a liquid, is then added to the mixture and mixing is continued until it is well dispersed through the rubber. The material which is in the form of a paste similar to rubber latex is then ready for use.

In an alternative method a rubber which vulcanizes under heat is used and the necessary oxidiser will be contained in the rubber before the resin coated particles are added. In this case the articles to which the insulating material is applied will have to be heat treated in order to vulcanise the rubber.

After evaporation of all the solvent the resin coated metal powder particles may be heat treated to improve the strength and degree of adhesion of the coating.

Where the insulating material is to be used in conditions where it is liable to be subjected to high mechanical pressures, for example for making air tight or liquid tight joints, ceramic material may be incorporated in the resin coating surrounding each particle. For this purpose a finely divided ceramic material is included in the resin solution before adding the metal powder in the first mixing operation previously described, and in this case there should be sufficient solvent to give a fluid creamy consistency. The quantity of resin is reduced by the amount of ceramic added so that the ratio of coating to metal in the coated particles is unchanged. The metal particles are formed with a thin adhesive film of ceramic and resin the resin bonding the ceramic films to the metallic particles and enabling the rubber material to be bonded to the ceramic.

The rectifier shown in Figure 2 is of the selenium type and comprises a number of plates 71 coated with selenium on one side and separated by lead discs and spacers 72 (not separately shown). The end plates 73 and 74 of the stack carry projecting terminals 75 and 76. Two sides of the stack and the ends of the stack are covered by a sheet of aluminum 77 the internal surface of which is covered by a coating 78 of the metal-powder-filled silicone rubber material previously described. The aluminum sheet is wrapped around the stack starting from one corner and the fourth side of the sheet is extended beyond the said corner to form a tab 79 in which there is a hole 80 by which the rectifier may be fastened to a chassis member. The remaining pair of faces of the stack may be coated with a layer of the metal-powder-filled silicone rubber material described.

Figure 3 shows an aluminum sheet 77 used for the manufacture of the rectifier shown in Figure 2 before it is wrapped around the rectifier stack. The aluminum sheet 77 is coated on one side with the metal-powder-filled silicone rubber material 78 and at one end is tapered to form the tab 79 in which there is formed the hole 80.

Figure 4 shows a group of three water cooled germanium rectifiers which share a common water-cooling system. Each rectifier comprises a casing 41 within which there is a 50 amp germanium rectifier cell which is mounted on a stud 42, the upper end of which carries a terminal 43. The opposite end 44 of the stud 42 passes through copper plate 45 which constitutes the other terminal and beyond the copper plate 45, the stud passes through a water jacket 46 formed from two shaped aluminum sheets 47 and 48 pressure welded together at their areas of contact 49. A layer 50 of the metal-powder-filled silicone rubber material electrically insulates the copper plate 45 and the stud 42 from the aluminum water jacket 46. Heat generated in the germanium junction inside the cell during operation of the rectifier is conducted to the stud 42 and copper plate 45 whence it is conducted through the layer 50 of insulating material to the water jacket 46.

Only plate type rectifiers of the selenium type have been described but the invention is equally applicable to other types of plate rectifiers such as copper oxide and magnesium-cupric sulphide rectifiers.

When the metal-powder-filled silicone rubber material described includes a cold-vulcanizing silicone rubber it is particularly useful when applied to the electrical insulation of plate-type and germanium rectifiers since the heat necessary to cure many other electrical insulators would destroy the rectification properties of the junction. However for other applications a silicon rubber which is vulcanized by the use of heat or pressure or both may be employed.

It is possible to produce metal-powder-filled silicone rubber material which can be extruded or calendered, and shapes such as washers, sealing rings or pads can be formed in dies. Such parts may be bonded to other materials such as metals of high conductivity to provide a continuous heat path.

What I claim as my invention and desire to secure by Letters Patent is:

1. An electrical insulating material comprising metal powder embedded in a matrix of rubber, the particles of the metal powder each being coated with an electrically insulating resin.

2. An electrical insulating material as claimed in claim 1 in which the rubber is a silicone rubber.

3. An electrical insulating material as claimed in claim 2 in which the silicone rubber is cold-vulcanising.

4. An electrical insulating material as claimed in claim 3 in which the resin coating incorporates a ceramic material.

5. An electrical insulating material as claimed in claim 1 in which the resin is a silicone resin.

6. An electrical insulating material as claimed in claim 1 in which the resin coating incorporates a ceramic material.

7. An electrical insulating material as claimed in claim 1 in which the metal powder is of one of the group consisting of copper powder, aluminum powder and a mixture of aluminium powder and copper powder.

8. An electrical insulating material as claimed in claim 7 in which the resin coating incorporates ceramic material.

9. An electrical insulating material as claimed in claim 8 in which the resin is a silicone resin.

10. An electrical insulating material as claimed in claim 5 in which the resin coating incorporates a ceramic material.

11. A method of making an electrical insulating material as claimed in claim 1 in which a metal powder is mixed with a solution of electrical insulating resin containing sufficient solvent to give a fluid consistency after addition of said metallic powder, the mixing being continued until the majority of the solvent is evaporated, the mixing being then stopped and the remainder of the solvent evaporated and the resulting coated powder particles are then incorporated into the rubber material, so that the metal powder is embedded in a matrix of rubber.

12. A method as claimed in claim 11 in which after mixing of the metal powder and the solution of electrical insulating resin, the mixture is spread out into a thin layer and the remainder of the solvent allowed to evaporate.

13. A method as claimed in claim 12 in which the mixture is lightly ground after all the solvent has evaporated.

14. A method as claimed in claim 11 in which a ceramic material is incorporated into the resin solution.

15. A method as claimed in claim 14 in which a vulcanizing catalyst is mixed with the rubber after incorporation of the resin-coated metal powder particles.

16. A method as claimed in claim 11 in which a vulcanizing catalyst is mixed with the rubber after incorporation of the resin-coated metal powder particles.

17. A dry rectifier comprising a pair of members having a rectifying junction between said members, and electrical insulating material surrounding the portions of said pair of members adjacent said junction, said electrical insulating material comprising metal powder embedded in a matrix of rubber, the particles of the metal powder each being coated with an electrically insulating resin.

18. A rectifier comprising a number of rectifier units forming a laminated block, said block having two pairs of opposite faces, a metal sheet wrapped round said two pairs of opposite faces, and a coating of insulating material on the internal surface of said sheet, said insulating material comprising metal powder embedded in a matrix of rubber, the particles of the metal powder each being coated with an electrically insulating resin.

19. A germanium rectifier comprising a germanium rectifier cell, a stud on which said rectifier cell is mounted and one end of which carries a terminal, a metal plate through which passes the other end of said stud, said metal plate constituting said other terminal, a water jacket surrounding the stud adjacent the plate, and a layer of insulating material between and in contact with said water jacket and said stud and plate, the layer of insulating material comprising metal powder embedded in a matrix of rubber, the particles of the metal powder each being coated with an electrically insulating resin.

20. A rectifier as claimed in claim 19 in which the water jacket is formed of a pair of adjacent similar shaped metal sheets spaced and parallel over most of their area but coming together at their edges to define a chamber, the areas of contact between the sheets being welded.

21. A group of a number of rectifiers as claimed in claim 20 in which the water jackets of all the rectifiers are formed from the same pair of metal sheets.

References Cited in the file of this patent

UNITED STATES PATENTS

| | | |
|---|---|---|
| 2,453,562 | Wright | Nov. 9, 1948 |
| 2,559,791 | Peyrot | July 10, 1951 |
| 2,725,505 | Webster et al. | Nov. 29, 1955 |
| 2,809,332 | Sherwood | Oct. 8, 1957 |